W. PERKINS.
Car Brake.
No. 24,818. Patented July 19, 1859.
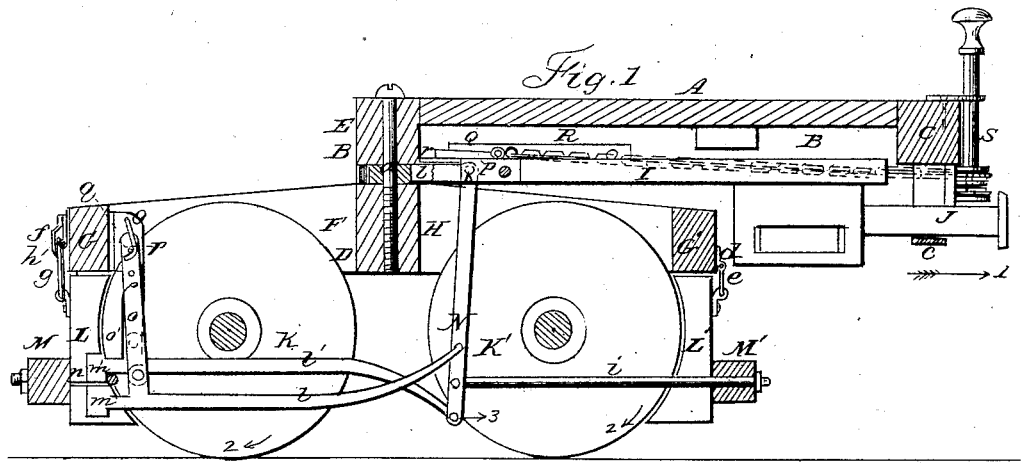
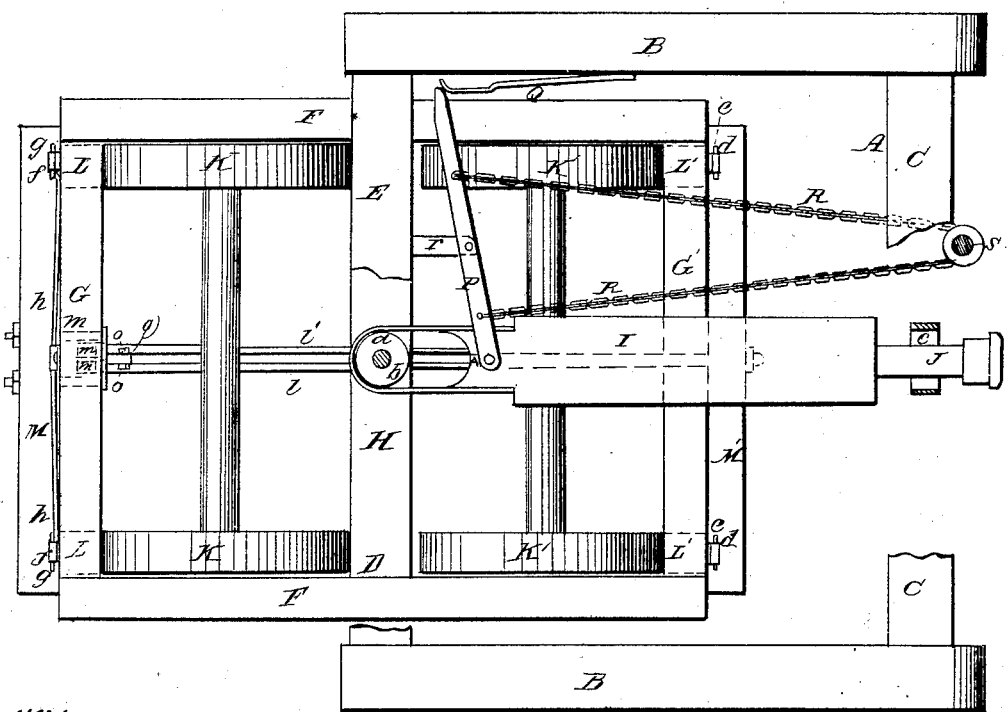
Witnesses
Isaiah P. Ripley
Prisalla R. Churchill
Inventor;
William Perkins

UNITED STATES PATENT OFFICE.

WILLIAM PERKINS, OF PLYMPTON, MASSACHUSETTS.

RAILROAD-CAR BRAKE.

Specification of Letters Patent No. 24,818, dated July 19, 1859.

*To all whom it may concern:*

Be it known that I, WILLIAM PERKINS, of Plympton, in the county of Plymouth and State of Massachusetts, have invented a new and Improved Car-Brake; and I do hereby declare that the following is a full, clear, and exact description of the same, reference being had to the accompanying drawing, forming a part of this specification, in which—

Figure 1 is a longitudinal vertical section of my invention. Fig. 2 is a plan or top view of ditto.

The great desideratum of a good car brake is to give the engineer perfect control over the same, so that he is enabled to put on or take off the brakes at pleasure as well when the train is going ahead as when it is going back, and with this purpose in view I have constructed the car brake which constitutes the object of this invention.

My invention consists in arranging the brakes in such a manner that they can be applied either by the momentum of the cars themselves, or by hand, the brakes being connected by means of a lever with the buffers, said lever to be fulcrated in a bar secured to one of the brake heads, and to connect with the other brake head by means of hooked rods, one or the other of which engages with a staple attached to the center of the brake head, and the brake shoes are suspended from the truck frame by means of an oblong eye, leaving the same sufficient play up and down, that the aforesaid staple is brought to engage with one of the hooks or with the other, according to the direction in which the wheels rotate, by the action of the friction between the brake shoes and the wheels; and this invention also consists in arranging a spring in such relation to the slide which carries the buffers, that when the train is in motion and steam is shut off the difference between the friction of the working parts of the locomotive and of the cars has no influence on the brakes.

To enable those skilled in the art to make and use my invention I will proceed to describe its construction and operation.

A represents a portion of the upper frame work of the body of a car, which is supported by the longitudinal side timbers, B, which are united at the ends by cross timbers, C, and the body of the car is supported on the truck frame, D, by the central cross timbers, E, in the usual manner, being attached to the same by a king-bolt, *a*. The truck frame is constructed as usual, and it consists of two longitudinal timbers, F, the ends of which are united by the cross timbers, G G, and their centers by the cross-timber, H. Attached to the center of the cross-timber, H, and between the same and the central cross-timber, E, of the car body, is a round piece, *b*, the king-bolt passing through both the cross-timbers, E and H, and through the center of the piece, *b*, which latter forms the guide for a slide, I, to the front end of which the buffer, J, is secured, which latter is supported by a pendant, *c*, attached to the end cross-timber, C, of the car body, so that the buffer, together with the slide, not only has a lateral but also a longitudinal movement.

The truck frame, D, rests on four wheels, K K′, and suspended from the end timbers, G G′, of the truck frame are the brake shoes, L L′, which are united by the brake heads, M M′, in the usual manner. The brake shoes, L′, on the front wheels, K′, of the truck are attached to the cross-timbers, G′, by means of round eyes, *d*, and rings, *e*, so that they can be drawn up to, or back from the face of the wheels without giving to the same any motion in another direction. The shoes, L, on the other hand are attached to the timbers, G, by means of oblong eyes, *f*, and by links, *g*, in such a manner that they have a slight up and down motion, and the weight of the brake shoes, L, and head, M, is counter-balanced, to a certain extent, by a spring, *h*, the ends of which hook into the links, *g*, as clearly represented in Fig. 2. The brakes are operated by means of a lever, N, which is fulcrated on a rod, *i*, which is rigidly attached to the brake head, M′, and the upper end of this lever is attached to the buffer-slide, I, by means of a pivot, *k*. Two rods, *l l′*, are attached to the lower end of this lever, one above and one below its fulcrum and at equal distances from the same and the ends of these rods are provided with two holes, *p p*, so that the hook, *m*, can be raised above and the hook, *m′*, brought down below the staple, *n*, and vice versa, and a catch, *q*, hooking over the pin, which secures the rods, *o o′*, to the lug, O, prevents these rods coming off spontaneously.

P is a lever which is fulcrated on an arm, *r*, attached to the under side of the central cross-timber, E, of the car body, and one end of this lever is pivoted to the top of the buffer-slide, I, as clearly represented in Fig. 2.

This lever strikes against a spring, Q, which is secured to one of the longitudinal side timbers, B, of the car body, and it connects with a vertical shaft, s, by means of a chain, K, the two ends of which are secured to the lever on different sides of its fulcrum and at equal distances from the same. The shaft, s, carries the hand wheel by which the brakes can be operated from the platform of each car in the usual manner.

The operation is as follows: The brakes of the train are first adjusted in the following manner: The brake of the forward truck of each car or that nearest to the locomotive must have the hook, m, of its upper rod, l, placed below, and the hook, m', of the lower rod, l', placed above the staple, n, as clearly represented in Fig. 1, in the drawing. The brakes of the rear truck of each car are arranged reversely, because the buffers at the opposite ends of each car act in opposite directions. These adjustments must be made whenever the locomotive is shifted from one end of the train to the other. When power is applied to the buffer to draw the car forward, the buffer and the brake lever, N, are drawn forward before the car moves. If the staple, n, is connected with the lower hooks m, the brakes are put on, and when the car begins to move, the friction between the wheels and shoes throws the latter up, the wheels moving in the direction of arrow 2, whereby the staple, n, is disengaged from the lower hook, m, and connected with the upper hook, m', as shown in Fig. 1. If the engineer wishes to put on the brakes, he checks the speed of the locomotive, and the momentum of the car forces the buffer together with the brake lever back whereby the lower end of the brake lever is thrown in the direction of arrow 3, and the hook, m', draws the brake shoes up to the wheels, and the train stops. If the power of the locomotive is now exerted to move the train in an opposite direction, or to back, the friction of the shoes against the wheels, which latter now revolve in a direction opposite to the arrows marked on them, unhooks, liberates and reverses the brake as before. Or if the power of the locomotive is again exerted in the direction of arrow 1, the buffer and the brake lever, N, are drawn forward, and the brakes are taken off before the car begins to move. By these means all the brakes of the whole train, with the exception of the rear brake of the rear car, are under the perfect control of the engineer; he can put them on and take them off whenever he wishes, which cannot be done with ordinary bumper brakes, as the same are put on as soon as the engine is reversed. With my brakes the train may be run in either direction, and the brakes can be put on and taken off by the engineer when the train is backing as well as when it is going forward, and no additional connections between the cars are required, and each brake can be operated by hand in the usual manner. Provision is also made to compensate for the excess of friction of the locomotive over that of the cars. When the train is in motion and steam is shut off the locomotive will back up or resist the momentum of the train, whereby the brakes would be put on, if the buffers would slide back without obstruction. Such an obstruction, however, is created by the spring, Q, which retains the end of the lever, P, and which opposes the sliding motion of the buffers, with a power equal to the difference between the resistance offered to the progress of the train by the friction of the working parts of the locomotive, and that offered by the friction of the working parts of the cars, so that the steam may be shut off, and the train be kept in motion without any influence on the brakes.

What I claim as new, and desire to secure by Letters Patent, is:

1. The arrangement of the sliding buffers, J, brake levers, N, rod, i, hooked rods, l l', and staple, n, to operate in combination with the brakes, substantially as and for the purpose specified.

2. Arranging the brake shoes, L, in combination with the staple, n, and hooks, m m', substantially as described.

3. The arrangement and combination of the hooked rods, l l', with the rods, o o', and with the staple, n, so that the hooks, m m', can be adjusted according to the direction in which the car is to run, substantially as set forth.

4. The arrangement and combination of the sliding buffer, J, lever, P, and spring, Q, operating substantially as specified.

WILLIAM PERKINS.

Witnesses:
 ISAIAH S. RIPLEY,
 PRISCILLA R. CHURCHILL.